United States Patent [19]

Vaeth et al.

[11] Patent Number: 6,005,244

[45] Date of Patent: Dec. 21, 1999

[54] DETECTING BYPASSED HYDROCARBONS IN SUBSURFACE FORMATIONS

[75] Inventors: John F. Vaeth, Slidell, La.; Charles W. Morris, The Woodlands, Tex.

[73] Assignee: Schlumberger Technology Corporation, Houston, Tex.

[21] Appl. No.: 08/942,961

[22] Filed: Oct. 2, 1997

[51] Int. Cl.$^6$ .................................................. G01V 5/10
[52] U.S. Cl. ..................................... 250/269.2; 250/269.7
[58] Field of Search ............................... 250/269.2, 269.7

[56] References Cited

U.S. PATENT DOCUMENTS

| | | |
|---|---|---|
| 2,991,364 | 7/1961 | Goodman . |
| 3,546,512 | 12/1970 | Frentrop . |
| 4,223,218 | 9/1980 | Jacobson . |
| 4,430,567 | 2/1984 | Oliver et al. ........................... 250/269.6 |
| 4,937,446 | 6/1990 | McKeon et al. ....................... 250/269.7 |
| 4,947,040 | 8/1990 | Mahdavi et al. . |
| 5,804,820 | 9/1998 | Evans et al. ........................... 250/269.6 |

*Primary Examiner*—Constantine Hannaher
*Attorney, Agent, or Firm*—John J. Ryberg; Brigitte L. Jeffery

[57] ABSTRACT

A tool for use in analyzing a subsurface formation for the presence of hydrocarbon includes a neutron generator capable of generating a burst of neutrons at a high energy level, some of which will collide inelastically with atomic nuclei in the subsurface formation to produce inelastic gamma rays and then will be captured by atomic nuclei to produce capture gamma rays. The tool also includes at least one radiation detector to detect the inelastic and capture gamma rays, and counting circuitry configured to produce a count of detected inelastic gamma rays and a count of detected capture gamma rays. Processing circuitry in the tool generates a numerical output by dividing the count of inelastic gamma rays by the count of capture gamma rays and then provides the numerical output to an output device for use in analyzing the subsurface formation for the presence of hydrocarbon.

30 Claims, 5 Drawing Sheets

DETECTING BYPASSED HYDROCARBONS IN SUBSURFACE FORMATIONS

BACKGROUND

The invention relates to detecting bypassed hydrocarbons in subsurface formations.

Oil and gas production companies typically want to produce as much hydrocarbon as possible in each down-hole drilling operation. Quite often a well contains recoverable quantities of hydrocarbon gas in formations bypassed during drilling.

Pulsed neutron capture (PNC) tools have been used for years to evaluate the presence of hydrocarbon gas behind well casings in bypassed formations. PNC tools operate under the theory that neutrons generated by the tools and traveling with sufficient energy will interact with surrounding atoms to produce energy in at least two different ways. First, a high-energy neutron will collide "inelastically" with a nucleus, exciting the nucleus and causing the nucleus to release a gamma ray. Second, the same neutron eventually will lose enough energy that it will reach a "thermal" state and will be "captured" by another atomic nucleus, which in turn will release a gamma ray of capture.

Most PNC tools measure the thermal neutron capture characteristics, or macroscopic capture cross-section ("sigma" or "Σ"), of a formation by detecting and counting gamma rays of the second type, i.e., those that occur as a result of thermal neutron capture, over a given period of time. In general, the presence of hydrocarbons in a formation increases the neutron capture time and therefore decreases sigma. In some formations, however, the measurement of sigma does not adequately identify certain forms of hydrocarbon trapped in the formation. For example, conventional sigma measurements often fail to identify natural gas in formations containing larger proportional amounts of shale suspended in a sand or thin shale laminations layering the sand, such as those found throughout the Gulf of Mexico. In these areas, natural gas often can be identified by detecting and counting only the number of gamma rays produced by inelastic collisions between the pulsed neutrons and atomic nuclei in the formation.

One PNC tool manufacturer produces a tool that attempts to detect bypassed gas reservoirs by observing the ratio of two different inelastic counts, one taken by a gamma ray detector located nearer the source of pulsed neutrons, and the other taken by a detector located farther from the neutron source. This ratio is measured at various depths to generate a "qualitative" graph, known as a RIN ("ratio of inelastics") curve. According to the developer of the RIN technique, the RIN curve provides a shallow measurement of hydrocarbon in the formation, i.e., two to four inches into the formation behind the well casing.

SUMMARY

In one aspect, the invention involves analyzing a subsurface formation for the presence of hydrocarbon using, e.g., a pulsed neutron capture (PNC) tool. A neutron source emits a burst of neutrons at a high energy level, some of which collide inelastically with atomic nuclei in the formation and then move through the formation at a lower energy level (e.g., as "thermal" neutrons). Gamma rays caused by the inelastic collisions are detected, as is the presence of neutrons moving through the formation at the lower energy level. A numerical output then is generated as a function of both the number of inelastic gamma rays detected and the number of neutrons detected at the lower energy level, and is applied to an output device to assist in analyzing the subsurface formation for the presence of hydrocarbon.

Various embodiments of the invention may include additional features. For example, two radiation detectors may be used to detect gamma rays. The number of inelastic gamma rays used to generate the numerical output may be a ratio of gamma rays detected by the two detectors, or the number may include only those gamma rays detected by the detector located farther from the neutron source. Also, neutrons moving through the formation at the lower energy level may be detected by detecting gamma rays generated when the neutrons are captured by atomic nuclei in the formation.

In another aspect, the invention features a tool for use in analyzing a subsurface formation for the presence of hydrocarbon. The tool includes a neutron generator capable of generating a burst of neutrons at a high energy level, some of which will collide inelastically with atomic nuclei in the subsurface formation to produce inelastic gamma rays and then will be captured by atomic nuclei to produce capture gamma rays. At least one radiation detector is used to detect the inelastic and capture gamma rays, and counting circuitry in the tool is used to produce a count of detected inelastic gamma rays and a count of detected capture gamma rays. The tool also includes processing circuitry that generates a numerical output by dividing the count of inelastic gamma rays by the count of capture gamma rays, and that provides the numerical output to an output device for use in analyzing the subsurface formation for the presence of hydrocarbon.

Various embodiments of the tool may include additional features. For example, the processing circuitry may be used to provide information indicating a subsurface depth for which the numerical output was generated, so that the output device may generate a graph illustrating multiple such numerical outputs taken at corresponding subsurface depths. The counting circuitry may be used to count only some of the gamma rays received by the detector. The processing circuitry may be used to adjust the inelastic count to reduce the effects of detector deadtime and background gamma rays in the subsurface formation. The inelastic count also may be adjusted by subtracting a constant number of counts representing an average baseline number of inelastic counts in the subsurface formation. The processing circuitry also may convert the inelastic count into a ratio by dividing a portion of the inelastic count attributable to gamma rays detected by one radiation detector by a portion of the inelastic count attributable to gamma rays detected by another radiation detector, and the ratio may be adjusted by subtracting a constant value representing an average baseline value of the ratio in the subsurface formation. The processing circuitry also may be used to convert the capture count into sigma of the subsurface formation and to adjust the formation sigma by multiplying it with a constant value representing an average baseline sigma.

In another embodiment of the tool, the inelastic count (INFD) may represent a background and diffusion adjusted count of gamma rays detected by a single radiation detector, and the capture count may be converted into the sigma response of the subsurface formation (SIGMA). The processing circuitry then may be used to generate the numerical output by performing the operation (INFD—ABV)*(ASV/SIGMA), where ABV is a constant value representing an average baseline value of inelastic counts in the formation and ASV is a constant value representing an average baseline sigma value.

The various embodiments of the invention may provide any of several advantages. For example, a single, qualitative curve (WINR) may be used to identify natural gas in shaly-sand formations with greater accuracy than presently possible. The WINR curve has been shown to identify bypassed gas with over 90% accuracy. The WINR curve also is easier to interpret and qualitatively understand than the displays used presently. The WINR curve may be generated with many types of logging tools, including PNC tools using single-burst or double-burst neutron pulses, as well as with other neutron-generating tools. The invention also provides a relatively deep measurement, e.g., ten inches or more, into the formation, because it utilizes both inelastic (shallow) and capture (deep) measurements in a log-generated solution curve. As a result, the invention can be used to detect gas through multiple well casings and through tubing within a well casing. The invention also can be used to find gas independent of certain characteristics of the formation, including, porosity, salinity, and permeability. Furthermore, the invention may be carried out with data previously collected with the Thermal Neutron Decay Time Tool (TDT™) and the Reservoir Saturation Tool (RST™) tools from Schlumberger.

Other embodiments and advantages will become apparent from the following description and from the claims.

DETAILED DESCRIPTION

Figure 1:
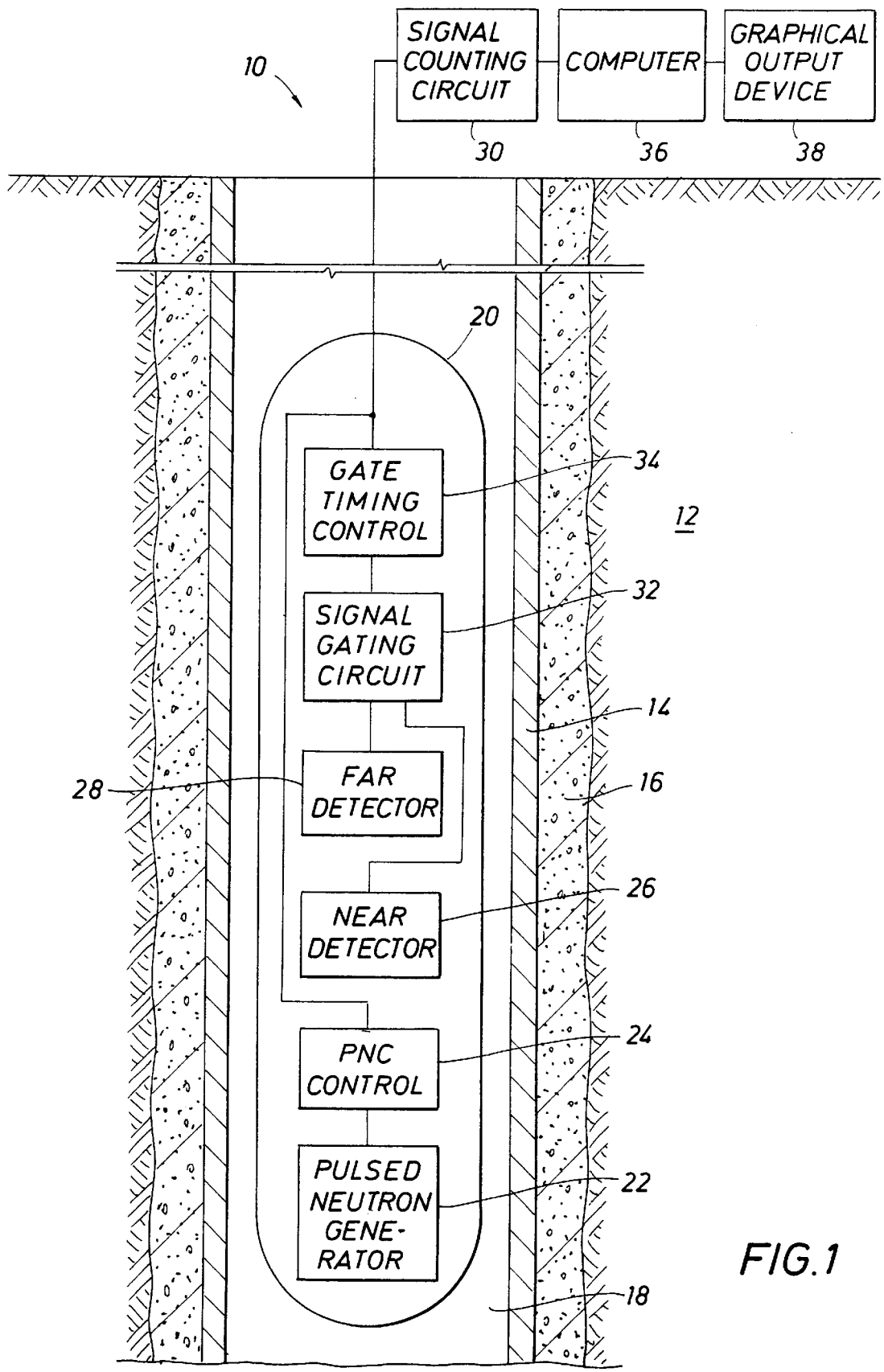
FIG. 1 is a block diagram of a tool that may be used to locate hydrocarbon in a formation.

Referring to FIG. 1, a well-logging system 10 (or well-logging "tool") may be used to locate hydrocarbon reservoirs in portions of a subsurface formation 12 hidden behind the casing 14 and cement 16 of a well bore 18. A PNC neutron burst tool 20 travels through the well bore 18, measuring the effects of high-energy neutrons on atomic nuclei in the surrounding formation and in the "borehole," which includes the casing 14, the cement 16 and any fluid within the well bore 18. A pulsed neutron generator 22 in the tool 20 produces the high-energy neutrons in response to signals from a PNC control circuit 24. The neutron generator 22 emits the neutrons in discrete bursts at an energy level (14 MeV) high enough to allow the neutrons to collide inelastically with and impart energy to surrounding atomic nuclei. The neutron generator may be like those described in U.S. Pat. No. 2,991,364, issued to C. Goodman on Jul. 4, 1961, and in U.S. Pat. No. 3,546,512, issued to A. H. Frentrop on Dec. 8, 1970, both of which are incorporated by reference.

As discussed above, inelastic collisions between neutrons and atomic nuclei cause the affected nuclei to release gamma rays, most of which are detected by two gamma radiation detectors 26, 28 in the PNC tool 20. Each detector 26, 28 generates an output signal when it detects a gamma ray. One of the detectors 26 (the "near" detector), is positioned approximately one foot from the neutron generator 22; the other detector 28 (the "far" detector) is positioned approximately two feet from the neutron generator 22. The actual positions of the detectors 26, 28 depend upon the characteristics of the PNC tool 20. The detectors 26, 28 also produce output signals upon detecting gamma rays released when the neutrons, slowed to the thermal state by inelastic collisions, are captured by atomic nuclei surrounding the PNC tool 20, as discussed above.

Signals produced by the detectors 26, 28 are delivered to a signal counting circuit 30 during prescribed time periods, known as count "gates." A signal gating circuit 32, which operates under the control of a gate timing control circuit 34, defines the count gates and therefore controls the flow of signals from the detectors 26, 28 to the signal counting circuit 30. The signal counting circuit 30 counts the gamma rays received by each detector during each count gate and provides the counts to a computer 36. The computer 36 stores the count information and uses it to generate a curve indicating whether and where hydrocarbon may be located in the formation 12, as discussed below. The computer 36 displays the curve on a graphical output device 38, such as a CRT, a printer, a plotter, or a recorder. The PNC system 10, including the PNC tool 20, may be like those described in U.S. Pat. No. 4,223,218, issued to Larry Jacobson on Sep. 16, 1980, and in U.S. Pat. No. 4,947,040, issued to Mehrdad Mahdavi et al. on Aug. 7, 1990, both of which are incorporated by reference.

Figure 2:
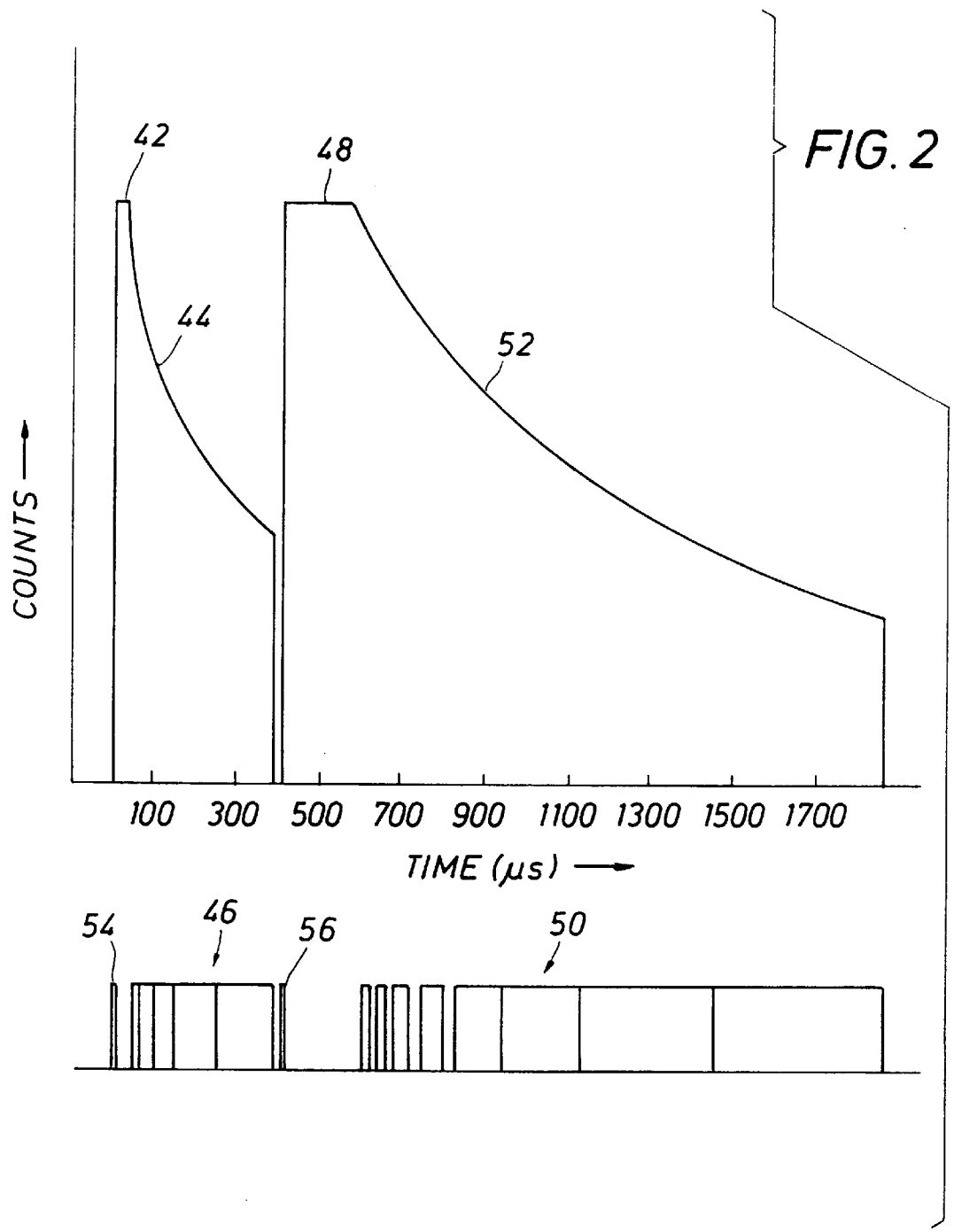
FIG. 2 is a graph illustrating inelastic and capture gamma rays counts during a dual-burst PNC cycle.

Referring now to FIG. 2, the PNC tool may be a "dual-burst" tool, such as the Dual Burst TDT™ (TDT™-P) tool or the Reservoir Saturation Tool (RST™) manufactured by Schlumberger Wireline & Testing.[1] In a dual-burst tool, the usual "long" neutron burst 48, from which the formation sigma is determined, is preceded by a "short" burst 42, which allows the PNC system to characterize and reduce the thermal neutron capture effects of the borehole on the gamma ray counts. The dual-burst timing sequence begins with a short (e.g., 18 μs) neutron burst 42, followed by several (e.g., five) "capture" count gates 46 during which the "fast" thermal neutron decay 44 is measured. Because the first burst is relatively short, the emitted neutrons do not penetrate too deeply into the surrounding formation, and the resulting gamma ray count is attributed primarily to the borehole sigma. The timing sequence then continues with a long (e.g., 151 μs) neutron burst 48, followed by several (e.g., eight) "capture" count gates 50 during which the "slow" thermal neutron decay 52 is measured. Gamma ray counts are accumulated by the computer for each gate slot over a predetermined counting period, which includes a predetermined number of dual-burst cycles (e.g., 128 cycles for a TDT™-P tool and an RST™ tool). The gamma ray counts for the counting period then are used to determine sigma for the formation, as described in U.S. Pat. No. 4,947,040, referenced above. Determining the formation sigma includes removing from the total capture counts the effects of the borehole sigma, neutron diffusion in the formation, and background gamma ray counts. Schlumberger's TDT™-P and RST™ tools differ, e.g., in number of count gates per dual-burst cycle, because different hardware and different operating techniques are employed in the tools.

[1] "Dual Burst TDT", "TDT" and "RST" are trademarks of Schlumberger Technology Corporation.

Each dual-burst cycle of the well-logging tool 10 also includes at least two additional gates: one "inelastic" gate 54 to count gamma rays resulting from inelastic collisions during the short neutron burst, and another "inelastic" gate 56 to count gamma rays resulting from inelastic collisions during the long neutron burst. The PNC system 20 uses the inelastic count totals in conjunction with the formation sigma to calculate a weighted inelastic ratio (WINR) for each counting period. The WINR for a TDT™-P tool is calculated as follows:

$$WINR = (INFD - ABV) * (ASV/SIGMA).$$

The term "INFD" represents the total number of inelastic counts by the far detector over the TDT™-P tool's 128-cycle counting period, adjusted to remove the effects of deadtime loss and background counts, and the term "SIGMA" represents the formation sigma. (The "deadtime" of a detector is the amount of time required to measure an incoming gamma ray, and the "deadtime loss" is the sum of all gamma rays that are not counted because they arrive while other gamma rays are being detected. Background counts are those that result from gamma rays generated naturally by the surrounding formation.) The terms "ABV" and "ASV" are constants representing, respectively, the average baseline value of INFD in an adjacent non-hydrocarbon-bearing zone in the surrounding formation and the average baseline sigma value in shaly sand. The proper values of ABV and ASV depend upon the tool being used and the composition of the formation, and the values are selected from a database of experimentally gathered data. In the shaly-sand formations found in the Gulf of Mexico, an ABV of 300 counts/second (cps) typically is appropriate, although values as low as 180 cps and as high as 400 cps are possible. Likewise, an ASV of 30 sigma units usually is appropriate in the Gulf, while values as low as 25 sigma units and as high as 37 sigma units are possible.

Because of the structural and operational differences between TDT™-P and RST™ tools, the WINR calculation for an RST™ tool differs from the calculation for a TDT™-P tool, as follows:

$$WINR = (IRAT - ABR) * (ASV/SIGMA).$$

As before, the terms "SIGMA" and "ASV" represent, respectively, the formation sigma and the average baseline sigma value in shaly sand. The term "IRAT" represents the ratio of inelastic counts by the far detector to inelastic counts by the near detector over the RST™ tool's 128-cycle counting period, adjusted to remove deadtime and background effects. The term "ABR" is a constant representing the average baseline ratio of far detector inelastic counts to near detector inelastic counts in a non-hydrocarbon-bearing zone in the surrounding formation. As with ASV, the proper value of ABR depends upon the tool being used and the composition of the surrounding formation, and the value is selected from a database of experimentally gathered data. In the Gulf of Mexico, an ABR of 0.48 usually is appropriate, and values ranging from 0.40 to 0.55 are possible.

Figure 3:
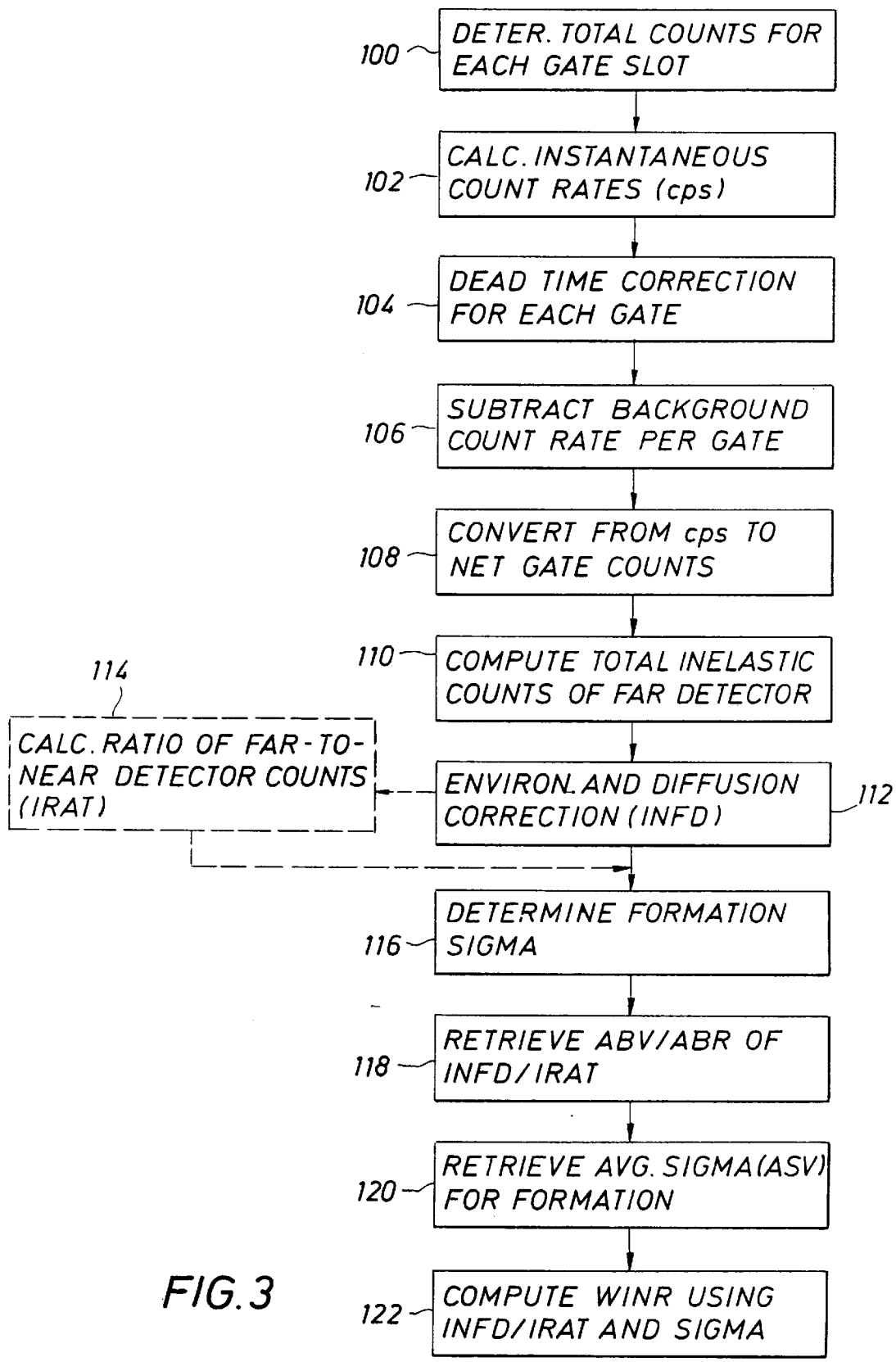
FIG. 3 is a flow chart for generating a qualitative identifier of hydrocarbon in a formation (a WINR curve).

Referring now to FIG. 3, the WINR calculations are performed by the computer. For each 128-cycle counting period, the computer first calculates the total counts accumulated during each gate slot of the dual-burst cycles in the counting period (step 100). In other words, the computer calculates the total counts received during all of the first count gates (i.e., the short-burst inelastic count gates) across the counting period, the total counts received during all of the second gates, and so on. The computer then converts the cumulative total count to an instantaneous count rate (cps) for each gate slot (step 102). With the instantaneous count rates, the computer performs deadtime correction and subtracts the background count rate for each gate slot (steps 104, 106). The deadtime corrected and background corrected count rates then are converted into net gate counts for each gate slot (step 108).

After generating the corrected net gate counts for each gate slot, the computer determines the total inelastic counts from the far detector and the near detector during the counting period (step 110). The total inelastic counts include gamma rays received at the far detector within the inelastic count gates during the short and long neutron bursts. The computer then performs environmental and diffusion correction on the total inelastic counts of both the far and near detectors (step 112). The corrected inelastic count total of the far detector becomes the value for the term "INFD" in the WINR calculation for the TDT™-P tool. The amount of environmental and diffusion correction required depends upon the tool itself and the composition of the surrounding formation and is incorporated into the computer's software based upon experimentally gathered data. In a PNC system using an RST™ tool, the computer next calculates "IRAT" by determining the ratio between the corrected total counts of the far detector and the corrected total counts of the near detector (step 114). Alternatively, INFD and IRAT may be derived from data previously collected and stored using Schlumberger's TDT™ and RST™ series tools.

In addition to computing inelastic count values, the computer determines the formation sigma ("SIGMA") by accumulating the total counts received by the far and near detectors during all capture count gates and performing the appropriate corrective functions, as described above and in U.S. Pat. No. 4,947,040 (step 116). The computer then retrieves from a prescribed storage location the average baseline value (ABV) of the term "INFD" or the average baseline ratio (ABR) of the term "IRAT," each of which are determined by the actual operating environment of the PNC system and are provided by a user of the PNC system (step 118). The computer also retrieves from a prescribed storage location the average baseline sigma value (ASV) for the formation, which also is provided by the user (step 120). The computer then uses the values of INFD/IRAT, SIGMA, ABV/ABR, and ASV to compute the WINR for the counting period (step 122).

Figure 4:
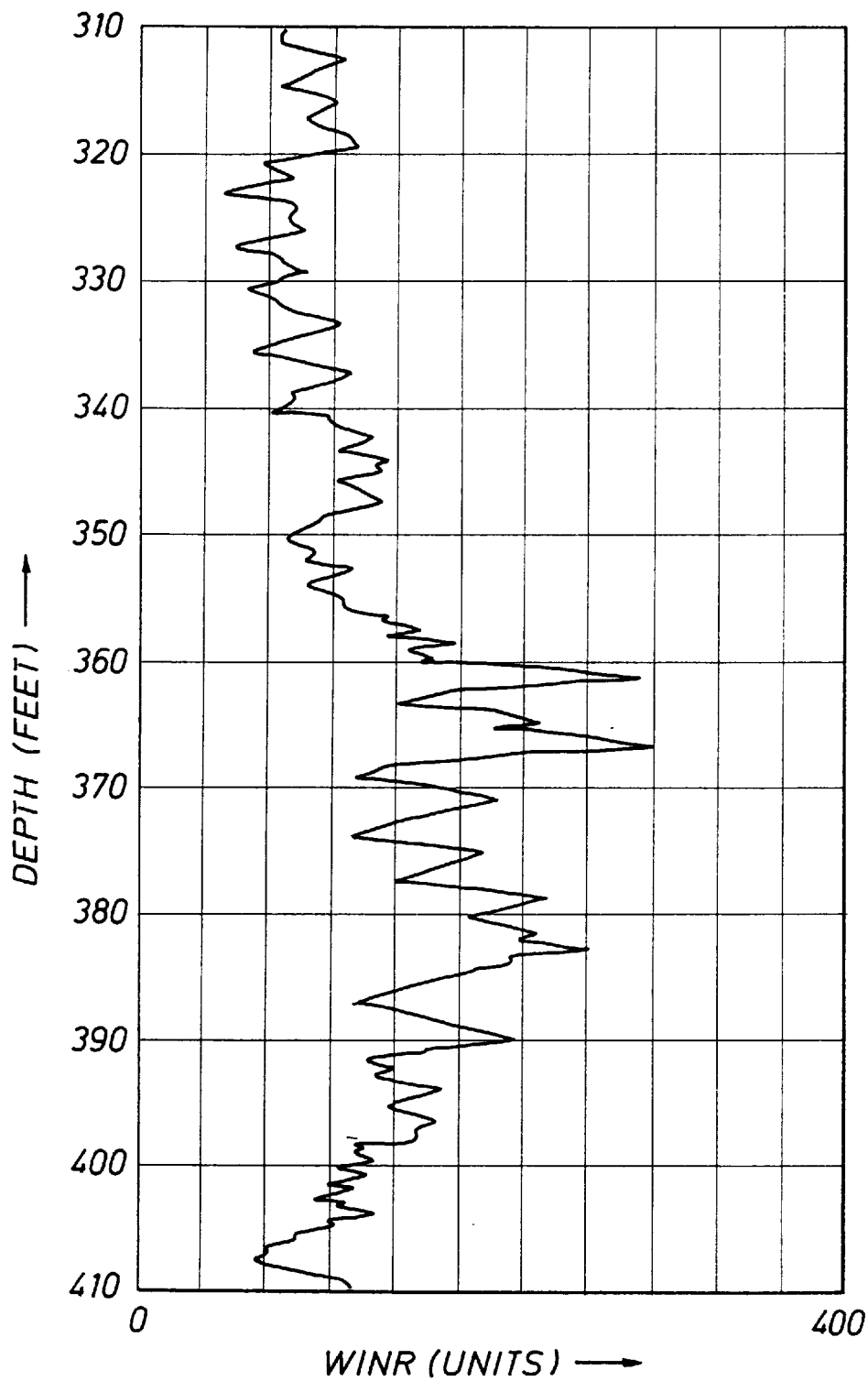
FIG. 4 is a WINR curve.

The computer computes a WINR value once per counting period and stores each WINR value in memory. The computer also may provide each WINR value to an output device, such as a monitor, a printer, or a plotter. In general, each counting period is approximately one second in length, so the computer provides a WINR output approximately once per second. If the PNC tool moves through the well bore at a rate of 1800 ft/h (the maximum logging speed for a TDT™-P tool), the computer provides a WINR output approximately once for every six inches of movement of the PNC tool. As shown in FIG. 4, a "WINR curve" can be generated by plotting the WINR values against the subsurface depths at which the values were taken. While the horizontal axis of the WINR curve represents the value of the WINR, the WINR curve provides a "qualitative" indication of the presence of hydrocarbon since a shift of the WINR curve by more than, e.g., 3.5 horizontal divisions indicates that the formation should be investigated more thoroughly at the corresponding depth.

Figure 5:
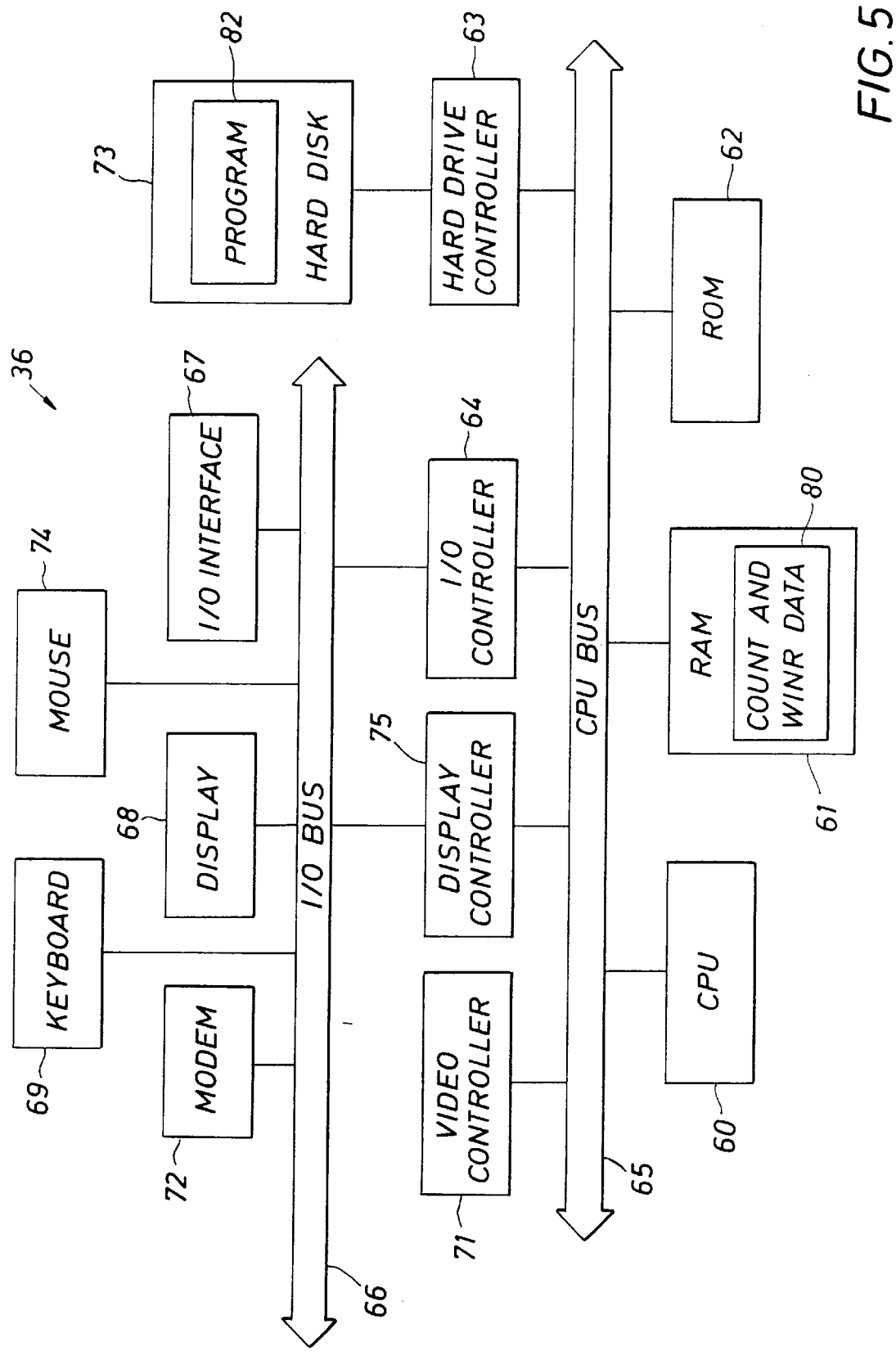
FIG. 5 is a block diagram of a computer that may be used to carry out the invention.

Referring now to FIG. 5, the WINR algorithm may be implemented in the form of a software program 82 containing executable instructions to be carried out in the computer 36. The computer 36 may include, among other things, a processor 60, a random access memory (RAM) 61, a non-volatile memory 62 (for example, a writable read-only memory (ROM) such as a flash ROM), a hard drive controller 63, a video controller 71, a display controller 75, and an input/output (I/O) controller 64 coupled by a processor (CPU) bus 65. The computer 36 may be preprogrammed, e.g., in ROM, or it may be programmed by loading the program 82 from another source, such as a hard or floppy disk, a CD-ROM, or another computer. The gate count data and WINR data 80 described above may be stored temporarily in RAM 61.

The hard drive controller 63 is coupled to a hard disk 73 suitable for storing executable computer programs, including the WINR program 82, and information such as the count and WINR data 80 temporarily stored in RAM 61. The I/O controller 64 is coupled by means of an I/O bus 66 to an I/O interface 67. The I/O interface 67 receives and transmits data in analog or digital form over communication links such as a serial link, local area network, wireless link, or parallel link. Also typically coupled to the I/O bus 66 are a display 68, a keyboard 69, a pointing device such as a mouse 74, and a modem 72 for connecting the computer 36 to another computer or to a computer network, e.g., to an Internet service provider (ISP) or an on-line service provider (OSP). Alternatively, separate connections (i.e., separate buses) may be used for some of the components connected to the I/O bus 66, including the I/O interface 67, the display 68 and the keyboard 69.

Other embodiments are within the scope of the following claims. For example, while the invention has been described in terms of "dual-burst" PNC tools, it may be implemented with other downhole logging tools, such as "single-burst" PNC tools or any other tools utilizing neutron generating/detecting devices. The invention also may be implemented with detectors other than gamma radiation detectors, such as thermal neutron or epithermal neutron detectors. The invention may be used in cased-hole wells, as described above, as well as in open-hole configurations, and it may be used with multiple casing strings (i.e., with multiple casings in the borehole). The invention may be used in boreholes in which any type of fluid is present, including both liquid and gas, and may be used to identify hydrocarbon in various types of subsurface formations throughout the world.

What is claimed is:

1. A method for use in analyzing a subsurface formation for the presence of hydrocarbons,the method compromising:
    emitting from a neutron source into the formation a short burst of neutrons at a high energy level, some of which collide inelastically with atomic nuclei in the formation and then move through the information at lower energy level;
    detecting gamma rays caused by the inelastic collisions during the short burst;
    emitting from the neutron source into the information a long burst of neutrons at the high energy level, some of which collide inelastically with atomic nuclei in the formation and then move through the formation at a lower energy level;
    detecting gamma rays caused by the inelastic collisions during the long burst;
    detecting gamma rays generating when the neutrons are captured by the atomic nuclei in the subsurface formation;
    determining a value represent a microscopic thermal nuetron captured-cross section (SIGMA);
    determining a value representing an average baseline sigma (ASV);
    generating a numerical output as a function of SIGMA, ASV, the number of inelastic gamma rays detected during the short burst, and the number of ineelastic gamma rays detected during the long burst; and
    using the numerical output to determine the presence of hydrocarbons in the formation.

2. The method of claim 1, wherein the gamma rays are detected by at least two radiation detectors.

3. The method of claim 2, wherein the step of generating the numerical output further comprises the step of determining a ratio (IRAT) of inelastic gamma rays detected by the detector located farther from the neutron source and the detector located closer to the neutron source.

4. The method of claim 3 wherein the step of generating the numerical output further comprises the step of determining an average baseline value (ABR) of the ratio (IRAT).

5. The method of claim 4 wherein the numerical output is generated using IRAT, ABR, ASV, and SIGMA.

6. The method of claim 5 wherein the step of generating the numerical output further comprises the step of performing the following operation: $(IRAT-ABR)*(ASV/SIGMA)$.

7. The method of claim 5, wherein ABR represents the average baseline value in a non-hydrocarbon bearing zone in the formation and ASV represents the average baseline sigma in a non-gas bearing shaly sand.

8. The method of claim 2, wherein the step of generating the numerical output further comprises the step of determining a total number of inelastic gamma rays (INFD) detected by the detector located farther from the neutron source.

9. The method of claim 8 wherein the step of generating the numerical output further comprises the step of determining an average baseline value (ABV) of inelastic gamma rays detected by the detector located farther from the neutron source.

10. The method of claim 9 wherein the numerical output is generated using INFD, ABV, ASV, and SIGMA.

11. The method of claim 10, wherein the step of generating the numerical output further comprises the step of performing the following operation: $(INFD-ABV)*(ASV/SIGMA)$.

12. The method of claim 10 wherein ABV represents the average baseline value in a non-hydrocarbon bearing zone in the formation and ASV represents the average baseline sigma in a non-gas bearing shaly sand.

13. The method of claim 1 wherein:
    the step of detecting gamma rays generated when the nuetrons are captured by atomic nuclei in the subsurface formation takes place during the short burst.

14. The method of claim 1 wherein:
    the step of detecting gamma rays generated when the nuetrons are capture by atomic nuclei in the subsurface formation takes place during the long burst.

15. A program, stored in a storage medium, for use in analyzing a subsurface formation for the presence of hydrocarbons, the program comprising executable instructions that enable a computer to:
    acquire a count of inelastic gamma rays detected as a result of irradiating the formataion with burst of high energy from a neutron source;
    acquire a count of gamma rays generated when the neutrons are captured by atomic nuclei in the subsurface formation;
    acquire a value representing the macroscopic thermal neutron capture-cross section (SIGMA);
    acquire a value representing an average baseline sigma (ASV); and
    generate a numerical output as a function of SIGMA, ASV, and the inelastic count to determine the presence of hydrocarbons in the formation.

16. The program of claim 15, wherein the count includes the inelastic gamma rays detected by a detector located farther from the neutron source (INFD).

17. The program of claim 16, wherein the count rate includes the inelastic gamma rays detected by a detector located closer to the neutron source.

18. The program of claim 17, further comprising an instruction that enables the computer to generate a ratio (IRAT) of inelastic gamma rays detected by the detector located farther from the neutron source and the detector located closer to the source.

19. The program of claim 18, further comprising an instruction that enables the computer to retrieve an average baseline value (ABR) of the ratio IRAT.

20. The program of claim 19, wherein the numerical output is further a function of ABR and IRAT.

21. The program of claim 16, further comprising an instruction that enables the computer to retrieve an average baseline value (ABV) of inelastic gamma rays detected by the detector located farther from the source.

22. The program of claim 21, wherein the numerical output is further a function of ABV and INFD.

23. A tool for use in analyzing a subsurface formation for the presence of hydrocarbon, comprising:
   a source capable of emitting into the subsurface formation a burst of neutrons at a high energy level, some of which collide inelasticallly with atomic nuclei in the formation and then move through the formation at a lower energy level;
   a detector capable of detecting gamma rays caused by the inelastic collisions during the burst and gamma rays generated when the neutrons are captured by atomic nuclei in the subsurface formation; and
   a circuit configured to:
      generate a value representing the macroscopic thermal neutron capture-cross section (SIGMA);
      generate a value representing and average baseline sigma (ASV); and,
      generate a numerical output as a function of SIGMA, ASV, and a number of gamma rays detected during the burst.

24. The tool of claim 23 wherein the tool comprises at least two detectors.

25. The tool of claim 24 wherein the circuit provides a value representing a ratio (IRAT) of inelastic gamma rays detected by the detector located farther from the neutron source and the detector located closer to the source.

26. The tool of claim 25 wherein the circuit provides a value representing the average baseline (ABR) of the ratio (IRAT).

27. The tool of claim 26 wherein the circuit generates the numerical output using IRAT, ABR, ASV, and SIGMA.

28. The tool of claim 24 wherein the circuit provides a value representing a total number of inelastic gamma rays (INFD) detected by the detector located farther from the source.

29. The tool of claim 28 wherein the circuit provides a value representing an average baseline (ABV) of inelastic gamma rays detected by the detector located farther from the source.

30. The tool of claim 29 wherein the circuit generates the numerical output using INFD, ABV, ASV, and SIGMA.

* * * * *